Feb. 24, 1931.  C. H. H. LUND  1,794,083
COMBINED DRILL TRANSPORT AND CONNECTING TROLLEY
Filed Nov. 11, 1929
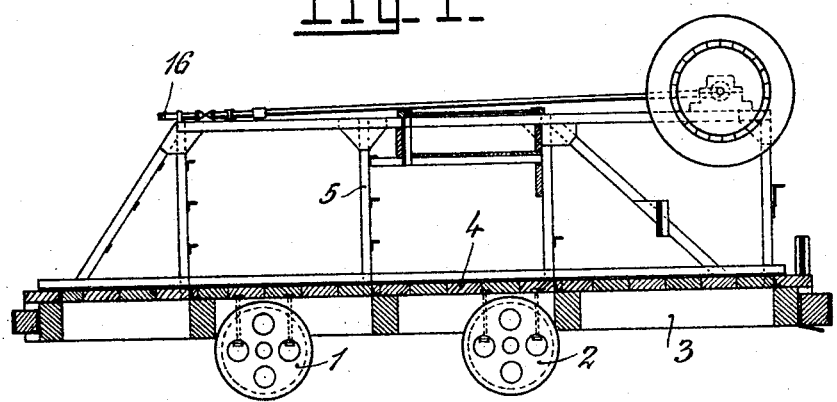
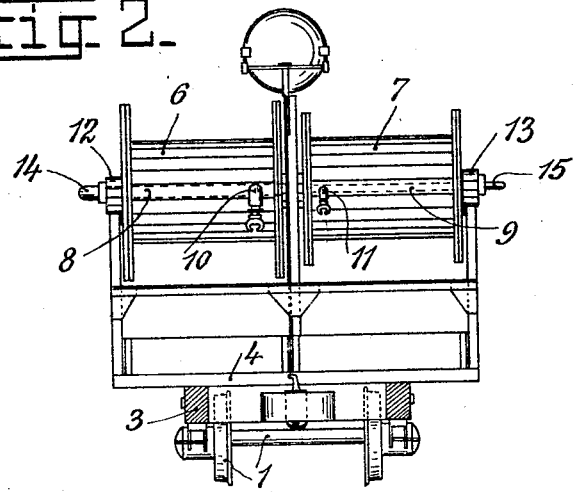
Inventor:-
Cristopher Henrik Hoelfeldt Lund
by
Langner, Parry, Card & Langner
Attys.

Patented Feb. 24, 1931

1,794,083

UNITED STATES PATENT OFFICE

CRISTOPHER HENRIK HOELFELDT LUND, OF STEINKJER, NORWAY, ASSIGNOR TO A/S HOELENG, OF TRONDHJEM, NORWAY

COMBINED DRILL TRANSPORT AND CONNECTING TROLLEY

Application filed November 11, 1929, Serial No. 406,439, and in Norway September 26, 1929.

In connection with the excavating work carried out in tunnels etc., the drilling machine on the different places where drilling takes place has to be connected with the stationary pressure air and water conduits of the tunnel.

The connection between the drilling machines and the stationary pressure air and water conduits usually is effected by means of flexible hoses, one end of which is connected to the stationary air and water conduits, whereas the other end is connected to the respective drilling machines.

Each time a drilling machine is moved to a new place it is therefore necessary to disconnect the flexible connecting hose at two points, and also the flexible hoses are very much exposed to wear by being pulled along the bottom of the tunnel.

In accordance with the present invention the connecting tubes for air and water to the drilling machines are permanently connected with the hollow shaft of reels for the flexible air and water hoses, by means of which the drilling machine is connected with the permanent conduits.

One end of the flexible hoses wound on the reels is permanently connected with a branch tube extending laterally from the hollow shaft of the reel, and a sufficient number of reels are mounted on a transport trolley carrying the connections for the drilling machine and being at the same time adapted for the transport of drills and other accessories.

The advantages of the said combined drill transport and connecting trolley mainly lies therein that the flexible hoses are always carried by the trolley so as to be less exposed to wear, and on the other hand a saving of time effected owing to the fact that the flexible hose does only need to be disconnected and connected at one point each time the drilling machine is moved from one place to another.

On the drawing an embodiment of the invention is illustrated. Fig. 1 is a longitudinal view through the combined transport and connecting trolley, whereas Fig. 2 is a rear view of the trolley.

In accordance with the embodiment illustrated, the trolley comprises two pair of wheels 1, 2, carrying a frame work 3 with a platform 4. On the platform 4 there is mounted a suitable frame work 5, provided with shelves etc. for carrying drills and accessories, and also supporting two winding reels 6, 7 for the flexible connecting hoses. Said winding reels are provided with tubular shafts 8, 9 having branches 10, 11 for connection to the inner ends of air and water hoses, the free ends of which are adapted to be connected with the permanent air and water conduits in the tunnel.

The tubular shafts 8, 9 through suitable packing boxes 12, 13 are connected with stationary air pressure and water pipes 14, 15 mounted on the frame work 5, and provided with connecting elements indicated at 16 in Fig. 1 for being connected to the drilling machine.

When the trolley carrying the hose reels has been moved to the place where the drilling machine is going to operate, it is only necessary to unwind so much of the hoses from the respective reels as is sufficient to connect the free ends of the said hoses with the nearest connecting point of the permanent pressure air and water conduits.

Claim:

A transport and connecting trolley for tunnel drilling machines comprising a wheel base, a frame carried by said wheel base, shelves upon said frame for the drilling machines and accessories, reels carried by said frame having tubular shafts, stationary air and water pipes also mounted upon said frame, said stationary air and water pipes being permanently connected at one end to said tubular shafts and being adapted to be connected at their free ends with a drilling machine and means connecting said tubular shafts with the inner ends of air and water hoses wound upon said reels.

In testimony whereof I affix my signature.

C. H. HOELFELDT LUND.